June 2, 1959     H. D. WITZEL     2,888,840
POWER TRANSMISSION MECHANISM AND CONTROL THEREFOR
Filed Oct. 22, 1956
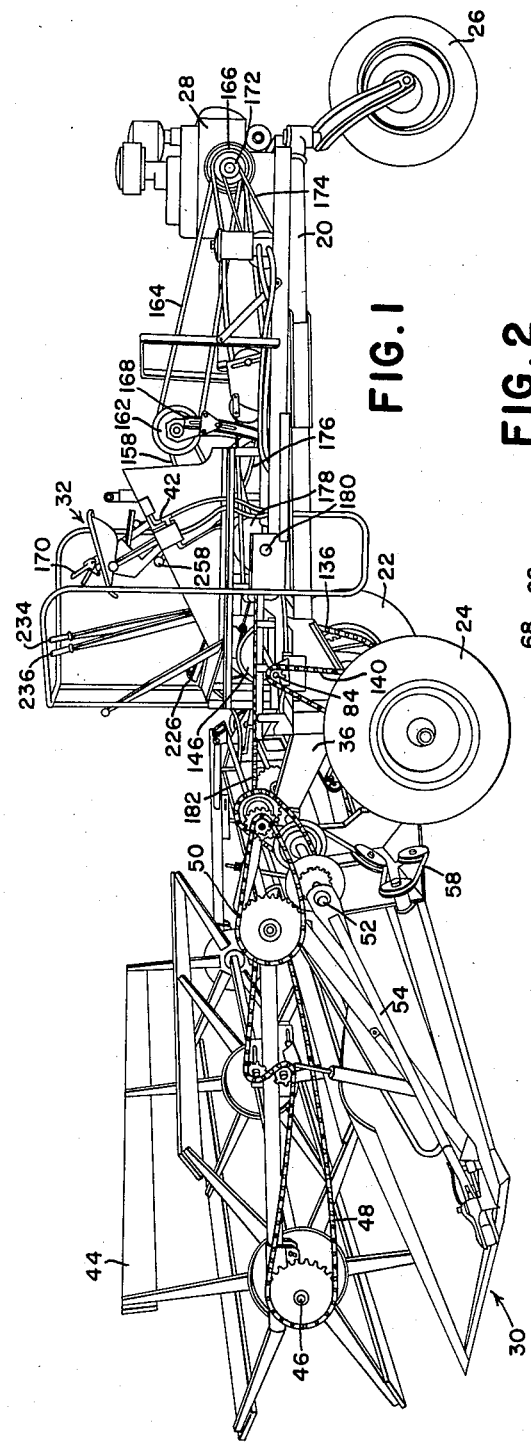
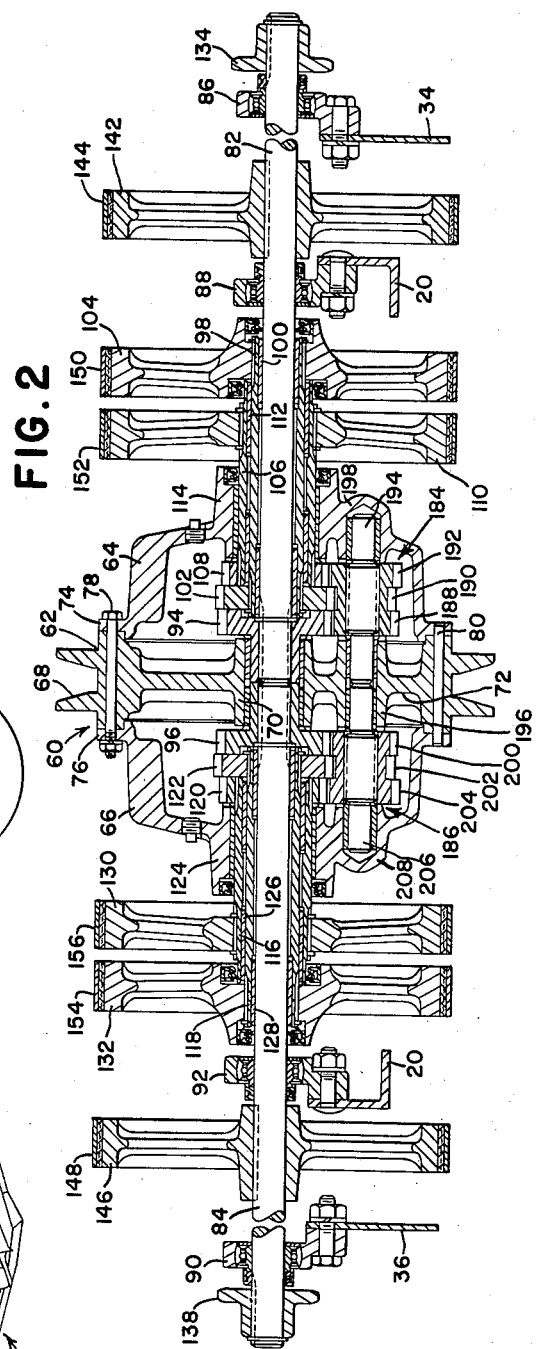
*INVENTOR.*
H. D. WITZEL United States Patent Office 2,888,840
Patented June 2, 1959

2,888,840

POWER TRANSMISSION MECHANISM AND CONTROL THEREFOR

Homer D. Witzel, Bettendorf, Iowa, assignor, by mesne assignments, to Deere & Company, a corporation of Delaware Application October 22, 1956, Serial No. 617,295

1 Claim. (Cl. 74—710.5)

This invention relates to the control of power transmitting mechanisms such as those used in vehicles. More particularly, the invention relates to a planetary drive and control means therefor for driving, reversing and steering an agricultural machine of the windrower type.

Among the requirements of self-propelled windrowers and similar machines are maneuverability and ease of operation, particularly in connection with the ability of the machine to turn relatively sharp corners. Despite its advantages over drawn windrowers, the self-propelled windrower must be relatively economical and easy to maintain. Various drive and control mechanisms have been tried heretofore and in the main suffer from one short-coming or another, due largely to the complications introduced by the steering, driving and reversing requirements.

According to the present invention, these disadvantages are eliminated by the design of a novel, simple and inexpensive planetary gear drive incorporating independent output shafts for the right and left hand ground wheels, whereby the mechanism may be controlled to vary the speed and direction of rotation of these wheels to accomplish maneuverability of the machine. The planetary drive features a compact unit including a central casing containing all the planetary gearing. It is a further object of the invention to utilize the driving mechanism for driving other parts of the windrower.

The foregoing and other important objects and desirable features inherent in and encompassed by the invention will become apparent as a preferred embodiment thereof is disclosed, by way of example, in the ensuing specification and accompanying sheets of drawings, the several figures of which are described immediately below:

Fig. 1 is a perspective of the machine as seen from the left hand side.

Fig. 2 is a transverse section through the planetary drive mechanism.

As already indicated, the driving mechanism and control therefor is especially adapted for an agricultural machine of the windrower type. However, certain principles of the invention are otherwise applicable.

The windrower chosen for purposes of illustration comprises a longitudinal main frame 20 carried at its front end on right and left hand front ground wheels 22 and 24 and at its rear end on a castering tail wheel 26. The main frame carries a power plant, here an internal combustion engine 28 which, through means to be presently described, furnishes power for the propulsion of the machine as well as for the driving part of a harvesting unit, here a windrower platform 30. Control and operation of the machine are accomplished from an operator's station 32.

The forward end of the main frame 20 includes right and left hand forwardly extending supports 34 and 36 whch, by means of suitable bearings (not shown) on a transverse axis, carry the platform or windrower means for vertical adjustment between raised and lowered positions. In the instance shown, raising and lowering of the platform is achieved by one or more hydraulic cylinder and piston assemblies (not shown). The power plant 28 drives a suitable pump, not shown, and the cylinders are controlled by a valve and valve lever arrangement such as that shown at 42 in Fig. 1.

The platform carries a typical harvester reel 44, which has its reel shaft 46 driven via a drive chain 48 from drive mechanism including intermediate chain and sprocket means 50 and a countershaft 52 which is journaled in the brackets 34 and 36. As best seen in Fig. 1, the countershaft furnishes drive, as via a pitman 54, to the harvester sickle (not shown) and via belt and sheave means 58 (Fig. 1) for driving the platform canvases which are of the type that move inwardly toward the center of the machine to discharge the harvested material in a windrow centrally between the ground wheels 22 and 24. The tail wheel 26 is offset laterally to one side of the windrow so that it does not run over the windrow.

The driving mechanism is best shown in Fig. 2, wherein it will be seen that the planetary gear drive includes a central casing 60 made up of a center driving member 62 and right and left hand cages or supporting means 64 and 66 respectively. The center member 62 has a peripheral driving portion, here a belt groove 68, a central hub 70 and an intervening radial web 72 which interconnects the peripheral portion 68 and the hub 70. The web substantially divides the casing 60 into right and left hand halves. Each cage is of substantially bell shape and these cages respectively have external flanges 74 and 76 which are removably affixed by bolts 78 and dowels 80 respectively to opposite sides of the center member 62.

Right and left hand driven shafts 82 and 84 project respectively oppositely from the casing 60 and have outer end portions journaled on the main frame. The right hand end portion is journaled in bearings 86 and 88 respectively on the right hand support 34 and on the right hand side of the frame 20. The outer end of the left hand shaft 84 is journaled in similar bearings 90 and 92 on the left hand support 36 and an adjacent portion of the main frame 20. The inner ends of the shafts 82 and 84 are in end-to-end relationship and are journaled in the hub 70 of the central driving member 62 by means of appropriate bearings and hub portions on right and left hand driven sun gears 94 and 96.

A right hand reverse sleeve 98 is journaled on the right hand driven shaft 82 by appropriate bearings, as at 100, and this sleeve has keyed to its inner end next adjacent to the right hand driven sun gear 94 a right hand reverse sun gear 102. The outer end of the reverse sleeve has keyed thereto a brake drum 104.

A right hand forward sleeve 106 is journaled on the right hand reverse sleeve 98 and has fixed to its inner end, next adjacent to the right hand reverse sun gear 102, a right hand forward sun gear 108. The outer end of the forward sleeve 106 is short of the outer end of the reverse sleeve 98 and has keyed thereto a forward brake drum 110.

In addition to being journaled on the reverse sleeve 98, as by bearings, as at 112, the forward sleeve 106 is journaled in hub means 114 of the right hand cage 64. The feature of this arrangement, together with a similar arrangement at the opposite side of the casing, to be presently described, is that the coaxial driven shafts 82 and 84 are journaled on the main frame and the casing and sleeves are interjournaled on the shafts and among each other, providing for a simple and compact arrangement requiring no complicated bearing supports.

The left hand side of the mechanism is symmetrical with the right side as respects the median plane through the center driving member 62, and to this end includes left hand forward and reverse sleeves 116 and 118. The inner ends of these sleves are respectively inside the cage 66 of the casing 60 and respectively have keyed thereto forward and reverse sun gears 120 and 122. The forward sleeve is journaled in a hub 124 of the left hand cage 66 and is also journaled, as at 126, on the reverse sleeve 118. The reverse sleeve is in turn journaled at 128 on the left hand driven shaft 84. The outer ends of the forward and reverse sleeves 116 and 118 have keyed thereto brake drums 130 and 132, respectively.

The outer end of the right hand driven shaft 82 extends to the right of the outboard bearing 86 and has keyed thereto a sprocket 134 by means of which a chain drive 136 is established to the right hand ground wheel 22. A similar drive is established between the left hand ground wheel 24 and the left hand driven shaft 84, via a sprocket 138 on the shaft 84 and a drive chain 140 between that sprocket and the wheel 24. Brake means for stopping or parking the vehicle are associated with the driven shafts 82 and 84. In the case of the former, the brake means includes a brake drum 142 and an encircling band 144. The left hand parking brake means includes a drum 146 keyed to the left hand driven shaft 84, which drum is encircled by a band 148. The control of these bands, as well as of bands 150, 152, 154 and 156, respectively for the drums 104, 110, 132 and 130, will be described below. Suffice it for the present to note that the several brake means 142—144, 104—150, 110—152, 146—148, 132—154 and 130—156 serve as means for controlling the planetary transmission and thereby provide the basic control for driving, reversing, steering and stopping the windrower.

The driving casing 60 is driven in the first instance by means of a belt 158 (Fig. 1) trained about the belt groove 68 in the casing and also about one of a pair of variable speed sheaves. The other sheave 162 is driven by a belt 164 from a sheave 166 on the engine 28. The speed of rotation of the casing 60 may be varied by altering the positions of the sheaves 162 relative to the sheaves 68 and 166, which in itself is a conventional arrangement. In the present instance, the distances between the respective sheaves are varied by means rockably supporting the sheaves 162, as on a swinging frame 168 (Fig. 1), the position of which is controlled by a speed control lever 170 positioned conveniently to the operator's station 32.

The platform countershaft 52 and the components connected thereto are driven directly from the engine by any suitable drive means not important here. Part of this drive means is fragmentarily illustrated as including a second engine drive sheave 172, a first belt 174, and an intermediate belt 176 and an intermediate sheave 178 which is keyed to a transverse shaft 180. This shaft is in turn connected, as by a chain 182 (Fig. 1) to the countershaft 52.

The planetary drive mechanism is completed, as to basic structure, by right and left hand triple planet pinion clusters 184 and 186. Although one cluster is shown in each cage of the casing 60, it will be understood that several clusters can be provided in equal angularly spaced relationship about the central or rotating axis of the mechanism.

The planet pinion cluster 184 comprises three planet pinions 188, 190 and 192 which are respectively in mesh with the right hand driven sun gear 94, the right hand reverse sun gear 102 and the right hand forward sun gear 108. The cluster is keyed to a shaft 194 which is journaled at its inner end in boss means 196 in the web 72 of the center driving member 62 of the casing 60. The opposite end of the shaft is journaled in coaxial boss means 198 in the radial wall of the right hand cage 64. Suitable bearings are used at opposite ends of the shaft.

The left hand planet pinion 186 comprises three planet pinions 200, 202, and 204, keyed to a planet pinion cluster shaft 206 which is supported at its inner end in the previously described boss means 196 and at its outer end in boss means 208 in the radial wall of the left hand cage 66. The pinions 200, 202 and 204 are respectively in mesh with the left hand driven sun gear 96, the left hand reverse sun gear 122 and the left hand forward sun gear 120.

Since the pinions 188, 190 and 192 are formed integrally or are otherwise fixed to the shaft 194, as when formed separately, they will rotate in unison. The same is true of the pinions 200, 202 and 204; although, the pinion shafts 194 and 206 are separate. The inner ends of the pinion cluster shafts 194 and 206 are axially withdrawable from the boss means 196 in the center member web 72. This is also true of the mounting of the hubs on the driven sun gears 94 and 96. Thus, either cage may be separated at 74—80 from the center member and the entire half unit moved outwardly. Since the construction is symmetrical, the same holds true for the other side of the casing. Thus, the arrangement provides a convenient method of assembly and disassembly of the unit for maintenance and repair. The feature of interjournaling the sleeves and driven shafts so as to rotatably support the casing, while the entire driving mechanism is simply supported on the main frame at the bearings 86, 88, 90 and 92, has already been elaborated.

From the description thus far, it will be seen that the driving mechanism establishes a forward-neutral-reverse drive means for operating the agricultural machine. The drive means includes the right hand reverse brake or control means 104—150, the right hand forward brake or control means 110—152, the left hand reverse brake or control means 132—154 and the left hand forward brake or control means 130—156. By selectively applying and releasing these brakes or control means, the operator is able to start, stop, steer and reverse the machine. The parking brake means 142—144 and 146—148 are also useful in stopping the machine as well as for holding the position of the machine on slopes. Normally, an agricultural machine travels at a relatively low rate and brake means such as those at 142—144 and 146—148 will be used only in emergencies, except for parking. Accordingly, reference to the brakes as parking brakes is descriptive only and is not intended to import any limitations into the invention.

When the machine is standing idle, with the engine running and the casing 60 therefore driven, the resistance of the machine to forward travel will cause the driven shafts 82 and 84 to remain stationary. As long as none of the control brake means 104—150, 110—152, 132—154 or 130—156 is applied, as by control levers 234 and 236, the several drums 104, 110, 130 and 132 will rotate idly. Because of the difference in gear ratios among the various sun and planet gears, the driven sun gears 94 and 96 will remain stationary, the reverse sun gears 102 and 122 will rotate in the same direction as the casing 60 and the forward sun gears 108 and 120 will rotate in a reverse direction as respects the direction of rotation of the casing.

Now, if the right hand forward brake 110—152 is applied, the right hand forward sun gear 108 becomes stationary and drive is transmitted therefore to the right hand driven sun 94, rotating this sun gear forwardly at a reduced speed, because of the fact that the driven sun gear 94 is larger than the forward sun gear 108. Thus, only the right hand wheel 22 will be driven and the machine will move forwardly but will achieve a left hand turn. If the left hand forward brake means 130—156 is simultaneously applied, the left hand sun gear 96 will rotate forwardly and the machine will travel straight ahead. Steering to the right or left may be readily accomplished by selectively applying and releasing the right and left hand forward brake means 110—152 and 130—156, respectively. To reverse the machine, both right and left hand reverse brake means 104—150 and 132—154 are simultaneously applied, accompanied, of course, by simultaneous release of the forward brake means 110—152 and 130—156. This means that the reverse sun gears 102 and 122 will stand still and the driven sun gears 94 and 96 will be driven in reverse directions, because of the differences in diameters between the sun gears 94 and 102 and 96 and 122. Steering while driving in reverse may be achieved by selectively applying and releasing the right and left hand reverse brake means. As already indicated, the relatively slow travel speeds of an agricultural machine will normally suffice to enable stopping of the machine simply by simultaneously releasing all the control brake means. However, stopping is augmented by the control of the right and left hand parking brake means 142—144 and 146—148 controlled by a pedal 226.

Features other than those categorically enumerated, as well as variations in the preferred structure illustrated, will readily occur to those versed in the art, all of which may be achieved without departure from the spirit and scope of the invention.

What is claimed is:

Drive means for a vehicle having laterally spaced apart right and left frame members, comprising: a closed gear casing intermediate the frame members and rotatable on a transverse axis and including an annular central drive member on said axis and having right and left radial faces, and right and left bell members secured respectively to said faces, each bell member having an outer end wall spaced inwardly from the proximate frame member and each end wall having an opening thereon on said axis, said drive member having a single central radial web including a hub oppositely recessed in co-axiality with said end wall openings; right and left shafts having inner ends received in the recessed hub and extending oppositely axially outwardly through said end wall openings to outer portions respectively proximate to the frame members; right and left bearing means journaling said outer portions respectively directly on the frame members; means journaling the shaft inner ends in the hub; right and left first sleeves respectively surrounding and journaled on the shafts and having inner ends within the casing respectively at opposite sides of the web and extending loosely through the respective end wall openings to outer ends short of the respective bearing means; right and left second sleeves respectively surrounding and journaled on the first sleeves and having inner ends within the casing respectively at opposite sides of the web and extending through and journaled respectively in the end wall openings to carry the casing independently of the aforesaid bearing means, said second sleeves respectively having outer ends terminating short of the respective bearing means; right and left sun gears fixed respectively to the inner ends of the shafts and first and second sleeves; right and left triple planet gear clusters in the casing and meshing respectively with the associated sun gears; means carried in the web and extending laterally outwardly therefrom respectively to the bell member end walls and journaling the planet gear clusters; first and second right brake means between the right bell member and right bearing means for respectively braking the right first and second sleeves; and first and second left brake means between the left bell member and left bearing means for respectively braking the left first and second sleeves.

References Cited in the file of this patent

UNITED STATES PATENTS

| | | |
|---|---|---|
| 1,338,835 | Lake et al. | May 4, 1920 |
| 1,905,952 | Scott | Apr. 25, 1933 |
| 1,909,579 | Gerlinger | May 16, 1933 |
| 2,486,815 | Banker | Nov. 1, 1949 |
| 2,496,429 | Baker et al. | Feb. 7, 1950 |
| 2,569,651 | Bannan | Oct. 2, 1951 |
| 2,582,966 | Curtis | Jan. 22, 1952 |